US006907047B2

(12) United States Patent
Chen et al.

(10) Patent No.: US 6,907,047 B2
(45) Date of Patent: Jun. 14, 2005

(54) SERVICE AWARE SWITCHED SDH/SONET/ TDM NETWORK

(75) Inventors: Weijing Chen, Austin, TX (US); Keith Joseph Allen, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 877 days.

(21) Appl. No.: 09/906,741

(22) Filed: Jul. 18, 2001

(65) Prior Publication Data

US 2003/0016662 A1 Jan. 23, 2003

(51) Int. Cl.[7] .............................. H04L 12/28; H04J 3/16
(52) U.S. Cl. ......................... 370/467; 370/401; 370/400
(58) Field of Search ................................. 370/230, 389, 370/236, 400, 392, 401, 467, 539, 395.2; 379/219

(56) References Cited

U.S. PATENT DOCUMENTS

| | | | |
|---|---|---|---|
| 5,495,484 A | | 2/1996 | Self et al. |
| 5,526,344 A | | 6/1996 | Diaz et al. |
| 5,526,350 A | | 6/1996 | Gittins et al. |
| 5,740,075 A | * | 4/1998 | Bigham et al. ............. 709/229 |
| 5,864,415 A | | 1/1999 | Williams et al. |
| 5,974,452 A | | 10/1999 | Karapetkov et al. |
| 6,108,337 A | | 8/2000 | Sherman et al. |
| 6,178,170 B1 | | 1/2001 | Duree et al. |
| 6,195,697 B1 | | 2/2001 | Bowman-Amuah |
| 6,205,121 B1 | | 3/2001 | Heuer |
| 6,205,148 B1 | | 3/2001 | Takahashi et al. |
| 6,330,239 B1 | | 12/2001 | Suzuki |
| 6,463,062 B1 | * | 10/2002 | Buyukkoc et al. ....... 370/395.1 |
| 6,789,118 B1 | * | 9/2004 | Rao ........................... 709/225 |
| 2002/0172220 A1 | * | 11/2002 | Baker et al. ................ 370/465 |

OTHER PUBLICATIONS

An article entitled "MPLS and Next Generation Access Networks", by Kankkunen, 1st European Conference on Universal Multiservice Networks, which was published in 2000.

An article entitled "Multiserver Optical Network: Main Concepts and First Achievements of the ROM Program", by Gravey et al., Journal of Lightwave Technology, vol. 19, No. 1, which was published in Jan., 2001, pp. 23–31.

An article entitled "QoS Support for Per–Flow Services: POS vs. IP–over–ATM", by Vittorio et al., IEEE Internet Computing, which was published on Jul.–Aug., 2000, pp. 58–64.

An article entitled "Optical Networking–A Multi–service Global Carrier's View", by Afferton, IEEE, published in 1999, pp. 399–400.

An article entitled "Performance Management in SONET–Based Multi–Service Networks", by Kheradpir et al., IEEE, GLOBECOM '91, published in 1991, pp. 1406–1411.

(Continued)

*Primary Examiner*—Duc Ho
(74) *Attorney, Agent, or Firm*—Greenblum & Bernstein, P.L.C.

(57) ABSTRACT

Method and apparatus to establish a communication link over a high speed communications network. A unique E.164 predetermined address assigned to a switching and access node of each network node of the high speed communications network is examined. In addition, a service address associated with a request to establish a communication link is examined. The service address indicates at least one of a type of service being requested, a network service detail, and a name of a desired service provider. Thereafter, an end-to-end communication link is established between the calling party and a destination party by routing a connection request through plural switching nodes in accordance with the calling party E.164 address, an E.164 address associated with the destination party, and the service address.

17 Claims, 1 Drawing Sheet

OTHER PUBLICATIONS

A printout of a website entitled "Fujitsu Joins Effort to Improve Data Communications Services", which has a release date of Oct. 30, 1998, and which was printed on Jun. 11, 2001, <http://www.fnc.fujitsu.com/news/view_229.html>.

A printout of a website entitled "Lightscape Networks Introduces the XDM Field–Proven Integrated Multi–Service Optical Networking Solution in North America", which has a release date of Mar. 15, 2001, and which was printed on Jun. 11, 2001, <http://biz.yahoo.com/bw/010315/2229.html>.

A printout of a website entitled "Web ProForum Tutorial: Simplifying Service Delivery: A View from the Optical Service Edge Tutorial", Sections 4–6, which was printed on Jun. 11, 2001, <http://www.iec.org/tutorial/serv_deliv/topic04.html...>.

A printout of a website entitled "TransMAX Optical Network Access", which was printed on Jun. 11, 2001, <http://www.fibre.com/Products/main_products_transmax.asp...>.

An advertisement entitled Optical Network Access System STM–1 Multiplexor (ONX1001E), Advanced Fibre Communications, Inc. Application Note, May, 2000.

An advertisement entitled AFC Announces New Packet–Aware SONET/SDH Optical Access Solutions With ONX1012 and OCX103, Advanced Fibre Communications, Inc., which has a release date of Oct. 27, 1999.

* cited by examiner

SERVICE AWARE SWITCHED SDH/SONET/TDM NETWORK

BACKGROUND OF THE INVENTION

1. Field of the Invention

The present invention is directed to a system and method for adding intelligence to a high speed communications network, such as, for example, a SDH/SONET/TDM network, in order to enable the assignment of time slots without user intervention.

2. Discussion of Background and Relevant Information

Today, telephone voice communications that originate at a first location, such as, for example, New York, are rapidly and efficiently routed along a public switched telephone network (PSTN) to a terminating point, such as, for example, Washington, D.C. without the assistance of, for example, an operator. However, this has not always been the case. When the telephone network company was originally designed, a plurality of operators were employed across the country to assist in establishing a communication link. When the person in New York wished to speak with the person in Washington, D.C., a New York operator would "patch" the call to, for example, a New Jersey operator. The New Jersey operator would then "patch" the call through to, for example, a Delaware operator. This process would be repeated as many times as necessary, until the call was received by an operator that handles calls in the Washington, D.C. region, who would then direct the call to the desired party. This process was inefficient and limited the number of separate (distinct) communications that could take place at any one time.

In order to automate the above procedure, a process was developed for assigning telephone numbers to telephone lines to provide for the automatic routing of calls placed over the PSTN. In particular, a public network addressing standard, known as ITU-T Recommendation E.164, was adopted, in which a unique address having a maximum of 15 digits is assigned to each telephone line.

As time passed, the amount of data transmitted over the PSTN dramatically increased. In addition, new types of data, such as, for example, digital computer data, began to transmitted over the telephone network. It was quickly determined that the PSTN was an inefficient network for transmitting high speed digital data. Accordingly, work began on the development of a new network appropriate for handling the quantity and speed of digital data to be transmitted between locations.

In order to transmit large quantities of digital information, the telecommunications industry developed a Synchronous Optical NETwork (SONET) that offers data transmission rates from approximately 51.84 Mbps to approximately 13.22 Gbps. It is noted that SONET has been adopted by the ITU-T with minor modifications (directed primarily to transfer speeds), where it is referred to as Synchronous Digital Hierarchy (SDH). SONET and SDH are closely related to each other, and for purposes of the present discussion, may be considered to be the same.

While SONET, SDH and Time Division Multiplex (TDM) networks permit the efficient transmission of large quantities of data, such networks require the manual setup and alteration of the origination and termination points. Accordingly, it is difficult to rapidly and easily change configurations and connection setups.

BRIEF DESCRIPTION OF THE DRAWING

The foregoing and other objects, features, and advantages of the invention will be apparent from the following more particular description of an embodiment as illustrated in the accompanying drawing, wherein.

DETAILED DESCRIPTION OF AN EMBODIMENT

Figure 1:
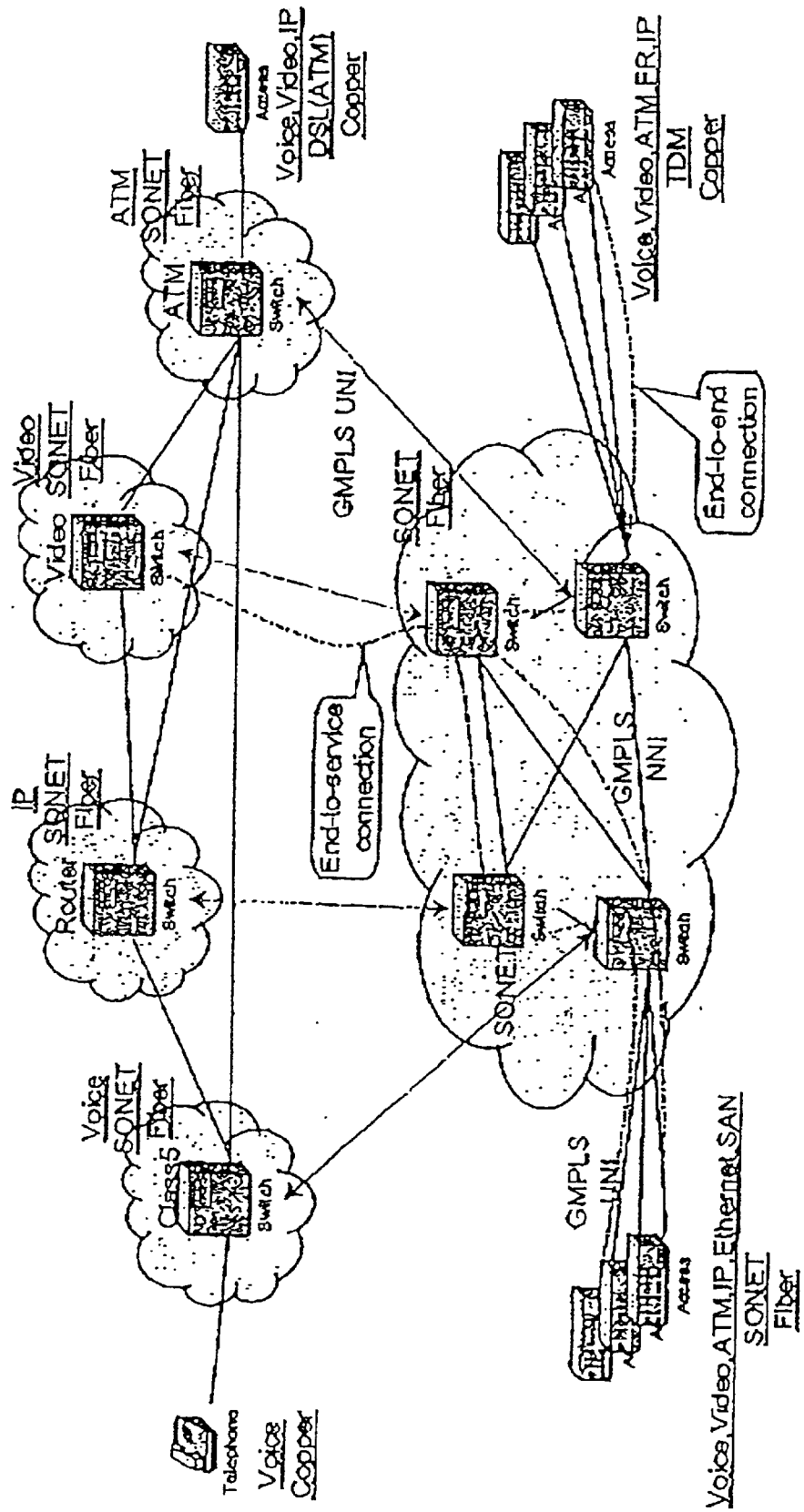
FIG. 1 illustrates an example of a network connection in accordance with an aspect of the present invention.

Accordingly, an object of the present invention is to extend the automation procedure applied to PSTN to SONET/TDM networks. Specifically, the present invention modifies the E.164 address scheme to extend it to SDH/SONET/TDM networks to enable call routing and line optimization without human intervention.

According to an object of the present invention, a method is disclosed for automating an establishment of a communication link over a high speed communications network, by assigning a unique address (such as, for example, an E.164 address) to each switching and access node of the high speed communications network, adding a calling party address to a signaling channel of the high speed communications network, and establishing an end-to-end connection link between a calling party and a destination party by routing a connection request through plural switching nodes in accordance with the unique address assigned to each switching and access node and a unique address of the destination party.

According to an advantage of the present invention, the method additionally comprises associating a service address with the end-to-end connection link to be established. The service address identifies a service type (such as, for example, whether a voice, video, etc. service is desired) and/or a service sub-type (such as, for example, whether a basic video service, a premium IP service, etc. is desired) and/or a service provider (such as, for example, the name of a desired service provider). According to a feature of the invention, the name of the desired service provider is provided in a URL format.

Another feature of the present invention is that an end-to-end connection link is established between a calling party and a destination party by routing a connection request comprises requesting the end-to-end connection link through a UNI signaling protocol.

According to another object of the present invention, a method is disclosed to establish a communication link over a high speed communications network, such as, for example, an optical network. A unique E.164 predetermined address that is assigned to a switching and access node of each network node of the high speed communications network is examined. A service address associated with a request to establish a communication link that indicates at least one of a type of service being requested, a network service detail, and a name of a desired service provider is also examined. Then, an end-to-end communication link between the calling party and a destination party is established by routing a connection request through plural switching nodes in accordance with the calling party E.164 address, an E.164 address associated with the destination party, and the service address.

According to a feature of the invention, the end-to-end communication link is released by routing a release request along the communication link to release every used resource.

According to another feature of the invention, a source access node requests an end-to-service connection via a UNI signaling protocol with information of a service address and a required network resource. In the disclosed invention, the end-to-service connection comprises examining a mapping database to determine an E.164 end address that best matches the service address.

Another object of the present invention pertains to a communications network (such as, for example, an optical network) that comprises a plurality of network nodes, in which each network node of the plurality of network nodes are assigned a unique identifier address (such as, for example, an E.164 address); an input device that enables a calling party to select a desired service parameter and a destination party identification address; and a routing mechanism that routes a communication transmission from a network node associated with a calling party identification address related to the calling party, across selected network nodes of the plurality of network nodes in accordance with associated unique identifier addresses to a destination party related to the destination party identification address. The desired service parameter comprises at least one of a type of service that is desired, a detail type of a desired service, and a desired service provider.

According to a feature of the invention, the routing mechanism employs a Generalized Multi-Protocol Label Switch (GMPLS) that is modified to include security enhancements.

SONET, TDM, and SDH networks are well known by those skilled in the art. Thus, they are not described herein in detail. While the following discussion will be provided with respect to a SONET network, it is understood that the present invention is equally applicable to TDM and SDH networks, along with other, equivalent type networks.

As illustrated in FIG. 1, a plurality of devices are interfaced to one another via switches that are connected via, for example, fiber (optic) lines and copper wire (twisted pair wiring) lines. While the drawing of FIG. 1 only illustrates the use of copper wire and fiber for connecting the plurality of switches, it is understood that alternative types of connecting devices, such as, but not limited to, wireless transmitters and receivers, may be used to interconnect various switches without departing from the spirit and/or scope of the present invention. Services transmitted over the network, include, but are not limited to, voice, video, IP and ATM.

The service-aware switched SONET/TDM/SDH network of the present invention is based upon a SONET Multi-Service Provisioning Platform (MSPP). The SONET MSPP includes, but is not limited to, the functionality of a TDM multiplexer, an IP router, an ATM switch, a Storage Area Network (SAN) switch, and a Gigabit Ethernet switch. As these elements are known by those skilled in the art, their structure and operation are not discussed herein. Further, it is understood that alterations therein may be made without departing from the spirit and/or scope of the present invention.

A SONET Distributed Communications System (DCS) presently functions to switch and rearrange private line voice, private line analog data, and T-1 lines, and perform all the functions of a normal "switch". Connections are typically set up in advance of when the circuits are to be switched (that is, not together with the call). Instead, the "connections" are made by calling an attendant, such as, for example, an operator or technician, who manually, or by dialing in on a computer terminal, establishes (makes) the connection.

By the present invention, the SONET Distributed Communications System (DCS) switch is enhanced with the addition of modified Generalized Multi-Protocol Label Switch (GMPLS) software, which will be described below, in order to enable the automatic establishment of connections without assistance of the attendant or technician. The GMPLS software is known to those skilled in telecommunications. Hence, only those "enhancements" implemented by the present invention to enable the automatic connections will be described in detail.

Address Assignment

FIG. 1 illustrates a typical telecommunications configuration, in which a plurality of connections are to be established. In order to automate the switching operation, the GMPLS is enhanced (modified) to include a register related to an end point address. Each network node (which includes a switching node and an access node) is assigned a single, unique global E.164 address, in a manner comparable to that for a PSTN. Similarly, each SDH/SONET/TDM link is assigned a single link identifier that is locally unique to the network node.

Service Address

Each service must be assigned an address. According to the present invention, the service address includes a data field pertaining to at least one of: (1) a service type; (2) a service sub-type; and (3) a service provider. In the disclosed embodiment of the present invention, the service address data contains data directed to either the service type or the service provider. Further, it is understood that the service address can be defined to include additional data without departing from the spirit and/or scope of the invention.

In the present invention, the service type data identifies the type of network service. That is, the service type data identifies the service as being, for example, a voice connection, a video connection, an IP connection, etc. In the present invention, the service sub-type data provides details about the type of network service. For example, the service sub-type data may indicate that the service is, for example, a premium IP service, a basic video service, etc. The service provider data indicates, for example, the name of the desired service provider, such as, for example, Sprint or AT&T. It is noted that in the disclosed embodiment of the invention, the service provider name is specified in a URL format, such as, for example, sprint.com or xyz.net. However, it is understood that alternative formats may be utilized without departing from the spirit and/or scope of the present invention.

Signaling Plane

A Data Communication Channel (DCC) comprises channels contained within section and line overhead that is used as embedded operation channels to communicate with each network element. DCC is employed with SONET networks; its configuration and operation is well known by those skilled in the art, and thus, is not discussed in detail herein.

According to the present invention, the modified GMPLS runs over Intelligent Peripherals (IP), which in turn runs over the signaling channel. The GMPLS routing address is assigned by a network operator for optimized routing. It is noted that the GMPLS routing address is not necessarily the same as the node's E.164 address. If the routing address is different from the node's E.164 address, the switching node maps the destination node's E.164 address to the GMPLS routing address and routes the connection request according to the mapped GMPLS routing address. In this way, the functionality of PSTN's local number portability is created in the switched SDH/SONET/TDM network. A user can thus move his/her access node onto a different location of the network and retain its E.164 address. The service provider's network will map the E.164 address to a new GMPLS routing address for connection purposes.

According to the present invention, the User Network Interface (UNI) signaling protocol employs the modified version of GMPLS. The UNI signaling protocol is known to those skilled in the art of telecommunications, and thus, a detailed description of the protocol is omitted herein. In the present invention, GMPLS is modified to enhance security to ensure that no network topology information is shared with the access node. In addition, a user request message is modified to always contain the address of the calling party by, for example, providing the requesting node's E.164 address. In this regard, an Intra-domain Network Network Interface (Intra-NNI) signaling protocol is based on GMPLS, while an Inter-domain Network Network Interface (Inter-NNI) signaling protocol is based on GMPLS with the addition of the above-mentioned security enhancement, so that only network reachability information sharing with another network is permitted.

Service

In the present invention, a source access node requests an end-to-end connection to the network using a standard UNI signaling protocol that contains information of the destination access node E.164 address and a required network resource. The connection request is routed through the network via the different switching nodes, and reserves the resource along the way. If the network can not provide the requested resource, the network sends a reject response back to the source access node.

The destination access node determines whether to accept or reject the connection request, and sends an appropriate response (e.g., acceptance response or rejection response) back to the source access node. The network then either allocates or releases the resource and passes the response back to source access node. When the source access node receives the acceptance response, the connection is established.

It is noted that in the disclosed embodiment, either the source access node or the destination access node may release the connection at any time. The release request is routed along the connection and every used resource is released, until the request reaches the other end of the connection. However, it is understood that variations in the release of the connection may be implemented without departing from the spirit and/or scope of the present invention.

End-To-Service Connection

According to the current invention, a source access node requests an end-to-service connection to the network using the UNI signaling protocol with information of the service address and required network resource. However, it is noted that the end-to-service connection may be implemented in other ways without departing from the scope and/or spirit of the present invention.

In the disclosed embodiment of the invention, the network examines a mapping database to find out the E.164 end address of the best matching service node for the service address. The criteria to be matched in the mapping database may be related to, but is not limited to, for example, the location, usage, date, time, etc. However, other parameters may be employed without departing from the scope and/or spirit of the invention. Once the E.164 end address is determined, the Service process, described above, is executed to end the connection.

Although the invention has been described with reference to an exemplary embodiment, it is understood that the words that have been used are words of description and illustration, rather than words of limitation. Changes may be made within the purview of the appended claims, as presently stated and as amended, without departing from the scope and/or spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet-switched network transmission (e.g., TCP/IP, UDP/IP, HTML, SHTML, DHTML, XML, PPP, FTP, SMTP, MIME); peripheral control (IrDA; RS232C; USB; ISA; ExCA; PCMCIA), and public telephone networks (ISDN, ATM, xDSL) represent examples of the state of the art. Such standards are periodically superseded by faster or more efficient equivalents having essentially the same functions. Accordingly, replacement standards and protocols having the same functions are considered equivalents.

We claim:

1. A method for automating an establishment of a communication link over a high speed communications network, comprising:

assigning an E.164 address to each switching and access node of the high speed communications network;

adding a calling party address to a signaling channel of the high speed communications network; and establishing an end-to-end connection link between a calling party and a destination party by routing a connection request through plural switching nodes in accordance with the E.164 address assigned to each switching and access node and a unique address of the destination party.

2. The method of claim 1, further comprising associating a service address with the end-to-end connection link to be established.

3. The method of claim 2, wherein the service address comprises identifying at least one of a service type, a service sub-type, and a service provider.

4. The method of claim 3, wherein identifying a service type comprises identifying a type of desired network service.

5. The method of claim 3, wherein identifying a service sub-type comprises identifying a detail of a desired network service.

6. The method of claim 3, wherein identifying a service provider comprises identifying a name of a desired service provider.

7. The method of claim 6, wherein identifying a name of a desired service provider comprises specifying the desired service provider in a URL format.

8. The method of claim 1, wherein establishing an end-to-end connection link between a calling party and a destination party by routing a connection request comprises requesting the end-to-end connection link through a UNI signaling protocol.

9. A method to establish a communication link over a high speed communications network, comprising:

examining a unique E.164 predetermined address assigned to a switching and access node of each network node of the high speed communications network;

examining a service address associated with a request to establish a communication link that indicates at least one of:
  a type of service being requested;
  a network service detail; and
  a name of a desired service provider; and establishing an end-to-end communication link between the calling party and a destination party by routing a connection request through plural switching nodes in accordance with the calling party E.164 address, an E.164 address associated with the destination party, and the service address.

10. The method of claim 9, further comprising releasing the end-to-end communication link by routing a release request along the communication link to release every used resource.

11. The method of claim 9, further comprising:

having a source access node request an end-to-service connection via a UNI signaling protocol with information of a service address and a required network resource.

12. The method of claim 11, the end-to-service connection further comprising:

examining a mapping database to determine an E.164 end address that best matches the service address to establish the end-to-end connection.

13. The method of claim 9, wherein the high speed communication network comprises an Optical Network.

14. A communications network, comprising:

a plurality of network nodes, each network node of said plurality of network nodes being assigned E.164 identifier address;

an input device that enables a calling party to select a desired service parameter and a destination party identification address; and a routing mechanism that routes a communication transmission from a network node associated with a calling party identification address related to said calling party, across selected network nodes of said plurality of network nodes in accordance with associated E.164 identifier addresses to a destination party related to said destination party identification address.

15. The communications network of claim 14, wherein said desired service parameter comprises at least one of:

a type of service that is desired;

a detail type of a desired service; and a desired service provider.

16. The communications network of claim 14, wherein said routing mechanism employs a Generalized Multi-Protocol Label Switch (GMPLS) modified to include security enhancements.

17. The communication network of claim 14, wherein said communication network comprises an optical network.

* * * * *